Feb. 8, 1944.　　　L. HUNTER, JR　　　2,341,443
WHEEL BALANCING APPARATUS
Filed March 8, 1941　　　4 Sheets-Sheet 1
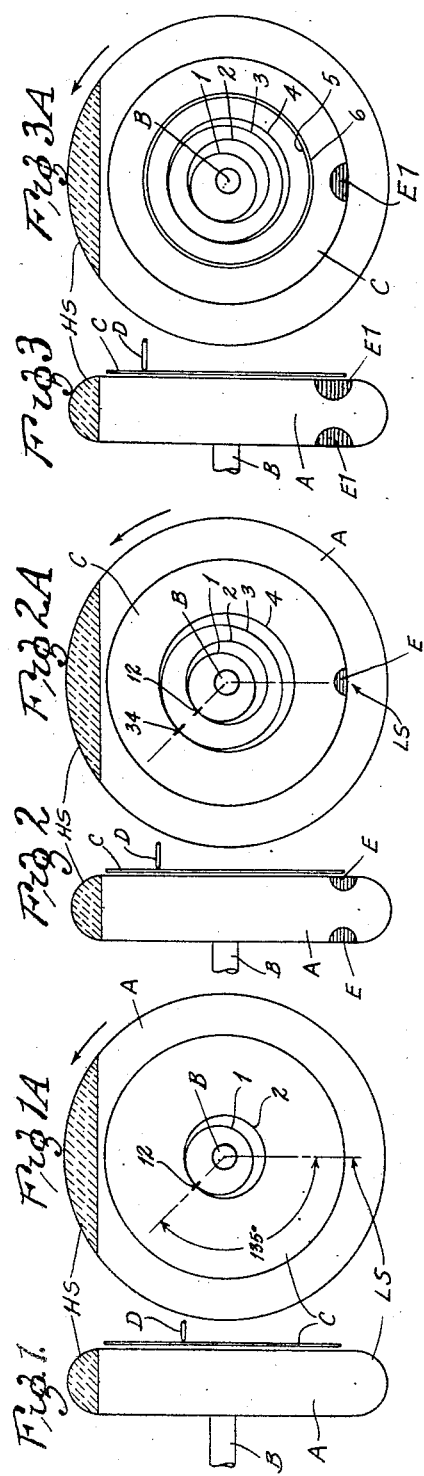
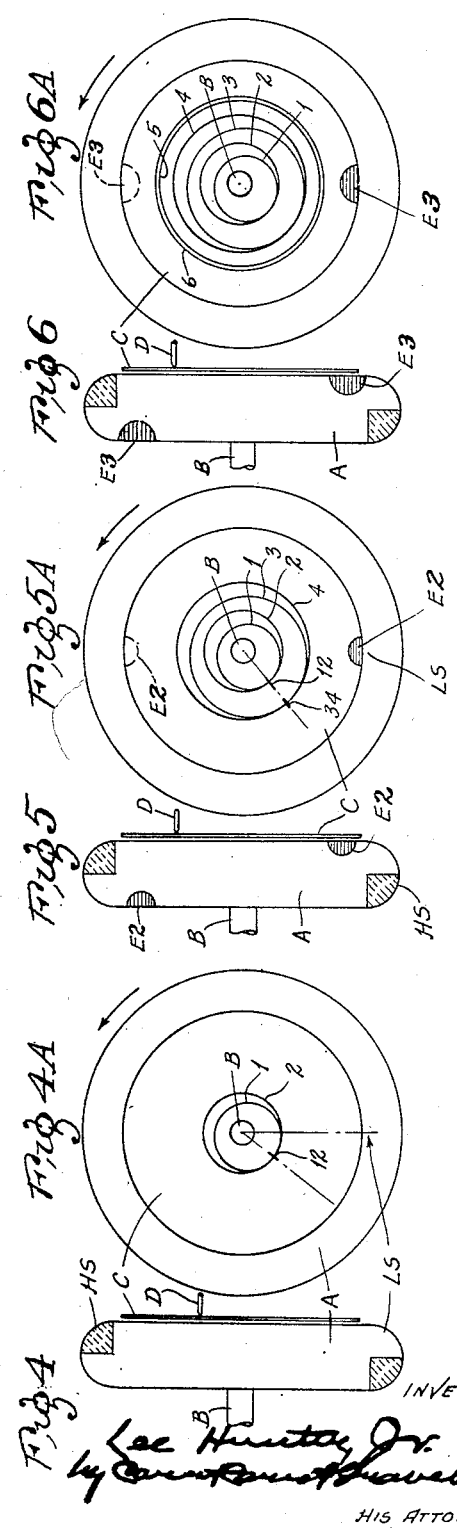
INVENTOR:
Lee Hunter, Jr.
HIS ATTORNEYS.

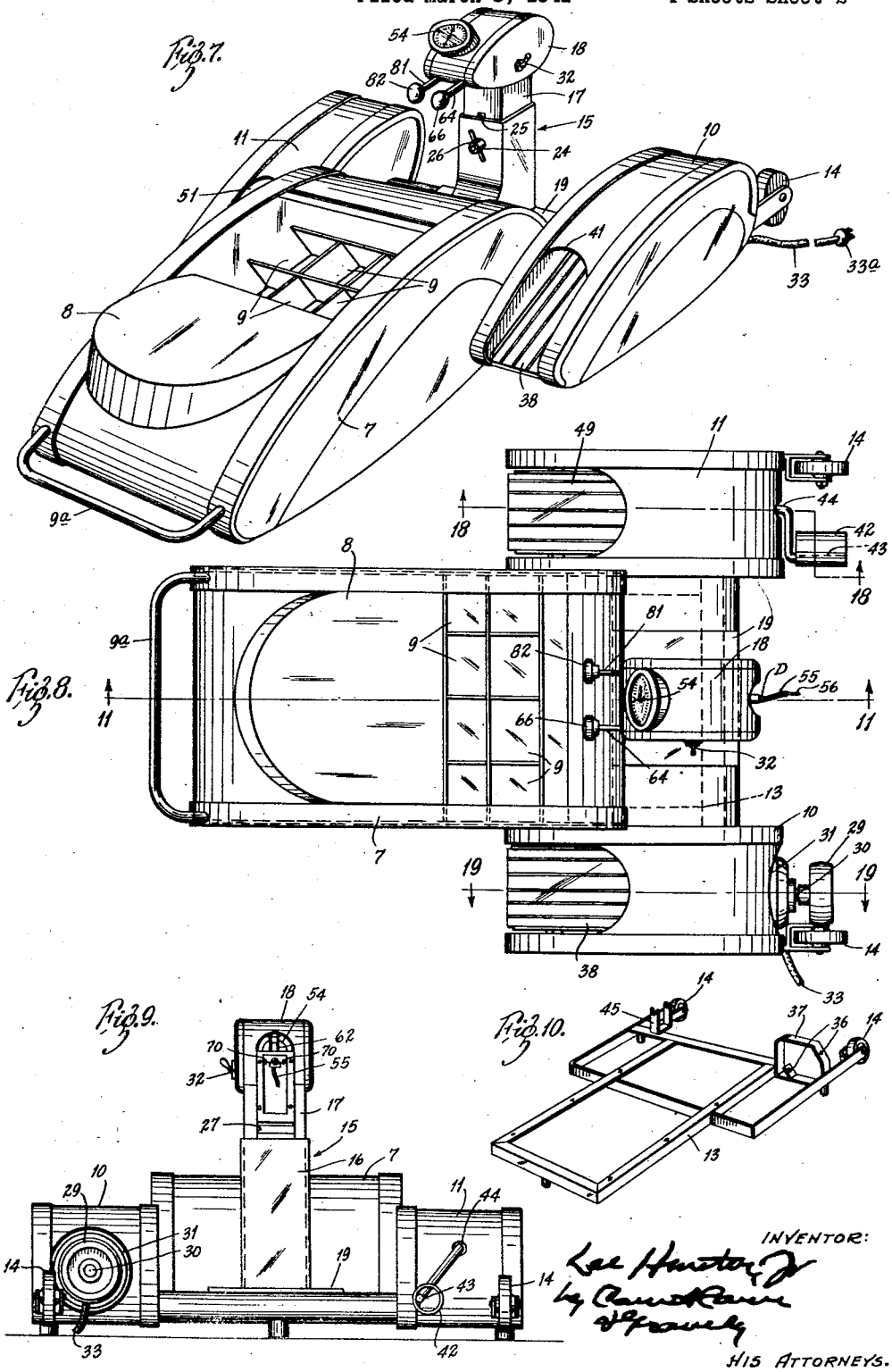

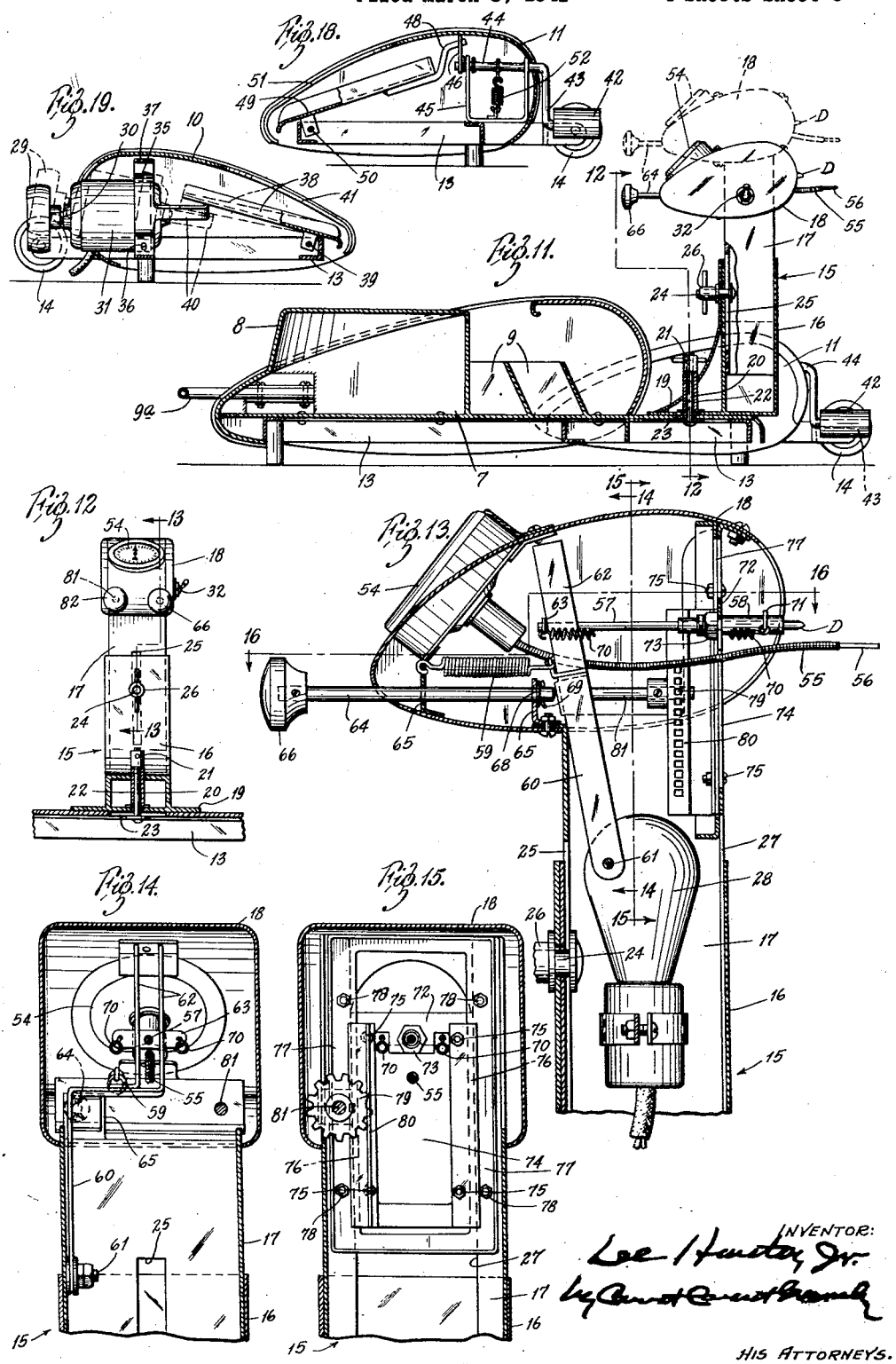

Feb. 8, 1944.　　　L. HUNTER, JR　　　2,341,443
WHEEL BALANCING APPARATUS
Filed March 8, 1941　　　4 Sheets-Sheet 4
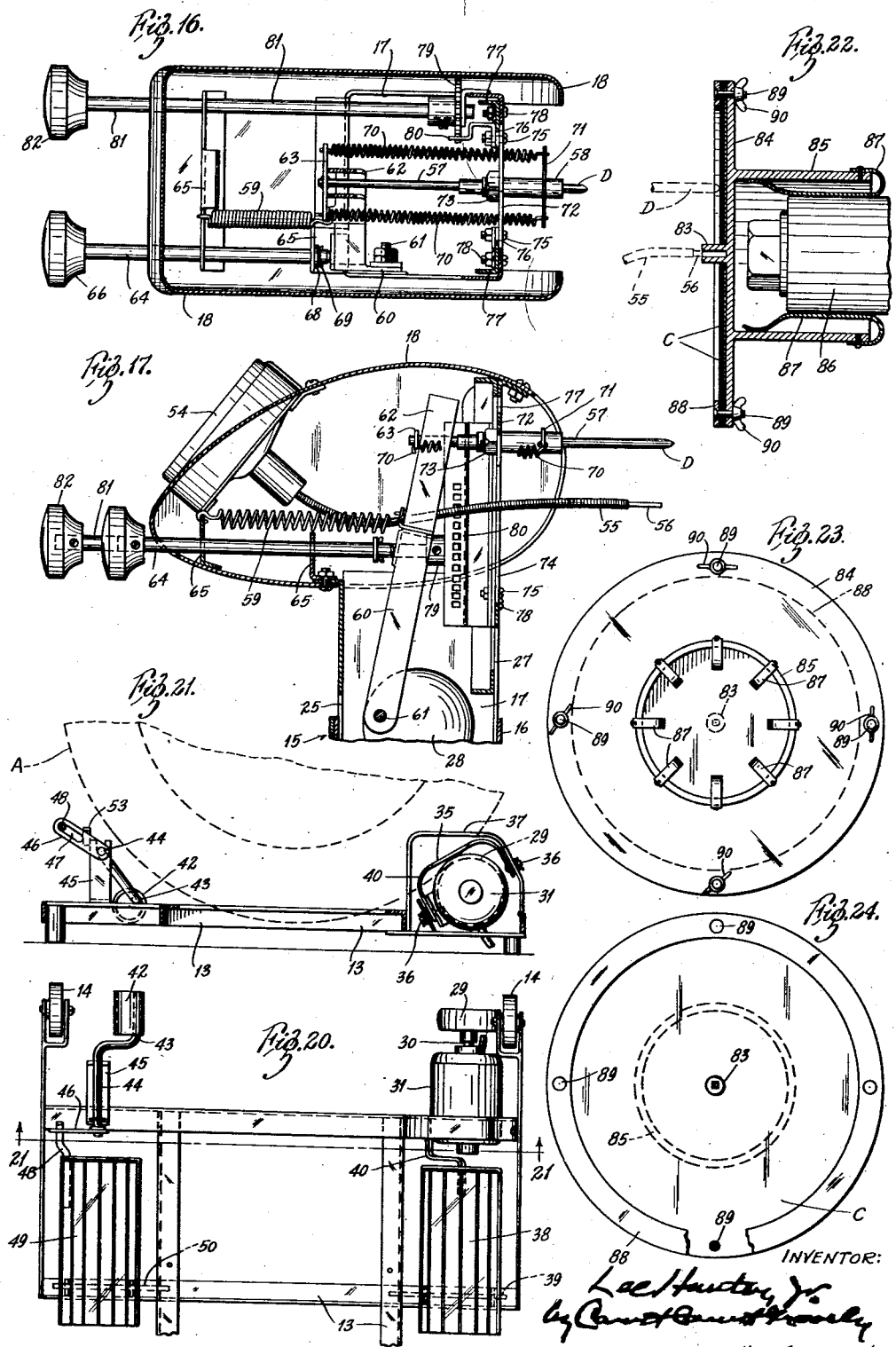

Patented Feb. 8, 1944

2,341,443

UNITED STATES PATENT OFFICE 2,341,443

WHEEL BALANCING APPARATUS

Lee Hunter, Jr., University City, Mo., assignor, by mesne assignments, to The Hartman Corporation of America, St. Louis, Mo., a corporation of Missouri Application March 8, 1941, Serial No. 382,369

10 Claims. (Cl. 73—53)

This invention relates to the balancing of rotary bodies, such as automobile wheels. One of the principal objects of the present invention is to provide for quickly and easily determining the standing or static and/or running or dynamic unbalance of the wheel and the location and amount of counterbalancing weights required to correct such unbalance without dismounting the wheel from the automobile. Another principal object of the invention is to provide a simple and easily operable portable apparatus for carrying out said object that is readily adjustable for wheels of different diameters, that will provide a seat for the operator during the operation of determining and correcting the unbalance of the wheel and a handy compartment for the tools and counterbalancing weights required for such operation, that will provide for rotating the wheel and that will indicate the speed of rotation of the wheel and provide a brake therefor. The invention consists in the apparatus and in the combinations and arrangements of parts hereinafter described and claimed.

In the accompanying drawings, which form part of this specification and wherein like symbols refer to like parts wherever they occur, Fig. 1 is an edge view and Fig. 1a a side elevational view of a wheel at the beginning of the wheel balancing process, Figs. 2, 3, 4, 5 and 6 are edge views similar to Fig. 1 and Figs. 2a, 3a, 4a, 5a and 6a are side elevational views similar to Fig. 1a, showing the subsequent steps in the wheel balancing operation, Fig. 7 is a perspective view of the portable apparatus used in marking the recording chart and in driving the wheel, Fig. 8 is a plan view of said apparatus, Fig. 9 is an end elevational view of the front or wheel opposing end of said apparatus, Fig. 10 is a perspective view of the base or bottom frame of said apparatus, Fig. 11 is a vertical central longitudinal section through said apparatus on the line 11—11 in Fig. 8, Fig. 12 is a vertical cross-section on the line 12—12 in Fig. 11, Fig. 13 is a vertical section through the upper portion of the stylus supporting column on the line 13—13 in Fig. 12, Figs. 14 and 15 are vertical transverse sections on the lines 14—14 and 15—15 in Fig. 13, Fig. 16 is a horizontal section on the line 16—16 in Fig. 13, Fig. 17 is a section similar to Fig. 13, showing the stylus raised and projected forwardly, Figs. 18 and 19 are vertical longitudinal sections on the lines 18—18 and 19—19, respectively, in Fig. 8, Fig. 20 is a plan view of the front portion of the base frame shown in Fig. 10, showing the pedals for engaging the brake and the motor driven wheel driver with the tread of the tire of the automobile.

Fig. 21 is a vertical transverse section on the line 21—21 in Fig. 20,

Fig. 22 is a central longitudinal section through the adapter plate, showing said plate mounted on the hub of the wheel and the recording disk mounted on said plate, Fig. 23 is a view looking at the inner, wheel opposing face of the adapter plate, and Fig. 24 is a view looking at the outer, recording disk supporting face of said adapter plate.

As shown in Sheet 1 of the accompanying drawings, A indicates an automobile wheel or other rotary body that is to be statically and/or dynamically balanced; B indicates a supporting spindle, shaft or axle for said wheel; C indicates a recording disk C of paper or other suitable material that is secured flatwise to the outer face of the wheel for rotation therewith; and D represents a stylus or marker adapted, when held stationary against the exposed face of the recording disk and the wheel rotated, to describe on said face of said disk a circle of rotation of said wheel.

In the process of determining and correcting the standing or static unbalance of the wheel A, the wheel supporting shaft or spindle B is elevated to permit free rotation of the wheel, and the stylus is engaged with the recording disk C and a circle 1 described thereon while the wheel is rotating at a relatively high rate of speed, say, 1,200 revolutions per minute. If the wheel is statically unbalanced, the centrifugal force generated by the heavy side thereof at such relatively high speed will be greater than that generated by the lighter side diametrically opposite to it and the shaft or spindle B will deflect toward the heavier side and thus cause the wheel to vibrate, whereby the circle 1 described by the stylus will be eccentric to the true central axis of said wheel. The speed of the wheel is then reduced to a relatively low vibrationless speed, say, 300 revolutions per minute, and the stylus is again engaged with the recording disk to describe a second circle 2 thereon which is concentric with the geometrical axis of the supporting shaft or spindle and outside of and substantially tangent to the first recorded circle 1. The point of tangency or closest approach of the two recorded circles 1 and 2 is then marked with a radial line 12. This radial line 12 through the point of tangency of the two recorded circles 1 and 2 indicates the position of the light spot LS of the wheel. The heavy spot HS of the wheel is, of course, diametrically opposite this position. However, the angle of lag, that is, the circumferential distance that the heavy spot HS of the wheel lags the recorded heavy spot thereof must be taken into consideration in correcting the unbalance of the wheel. This angle of lag varies according to the speed of rotation of the wheel, the weight and size thereof, the rotational moment of inertia and the resiliency and frequency of vibration of the wheel supporting shaft or spindle. For the wheel shown, it will be assumed that the angle of lag is 135 degrees at a speed of 1,200 revolutions per minute. To determine the correct angle of lag, a small weight E is then secured to the wheel at an angle of 135 degrees from line 12 in the direction of rotation, the wheel is again rotated at a speed of 1,200 revolutions per minute, and the stylus is engaged with the recording disk to describe a third circle 3 thereon outside of the two circles 1 and 2. The wheel is then slowed down to a speed of 300 revolutions per minute and the stylus engaged with the recording disk to describe a fourth circle 4 thereon that is outside of and substantially tangent to the circle 3 at the outmost point thereof. The point of tangency or closest approach of the circles 3 and 4 is then marked with a radial line 34. If the line of tangency 34 of the second group of circles 3 and 4 coincides with the line of tangency 12 of the first group of circles 1 and 2, it indicates that the assumed lag angle is correct and that the location of the weight is correct. The amount of weight E1 necessary to balance the wheel is then applied at the point where the finding or test weight E is located as shown in Figs. 2 and 3, the weight may be divided equally on opposite side faces of the wheel.

A fifth circle 5 and a sixth circle 6 are then described on the recording chart outside of the second group of circles 3 and 4, the fifth circle 5 being described while the wheel is rotating at substantially 1,200 revolutions per minute and the sixth circle 6 being described while the wheel is rotating at substantially 300 revolutions per minute. If the third group of circles 5 and 6 are concentric, it indicates that the amount of weight E1 is correct and that the wheel is turning about the same center, that is, the true central axis of the shaft, at both high and low speeds. However, if the selected lag angle is greater than the true lag angle, the line of tangency 34 of the second group of circles 3 and 4 will be offset circumferentially from the line of tangency 12 of the inner group of circles 1 and 2 in a direction opposite to the direction in which the wheel was rotated in describing both groups of circles; and such offsetting indicates that the weight E should be shifted circumferentially of the wheel in the same counter rotative direction. After thus shifting the weight, the new position thereof is checked by describing another group of circles, similar to and outside of the circles 3 and 4, on the recording disk in the manner previously described and, if the point of tangency of newly inscribed group of circles is in alinement with the point of tangency of the innermost group of circles 1 and 2, it indicates that the weight is correctly located for the lag angle of the wheel being tested.

Some wheels are both statically and dynamically unbalanced. With such wheels, it is necessary to first correct the wheel in the manner hereinbefore described for static unbalance and then correct for dynamic unbalance. Should the wheel be dynamically unbalanced only, this fact will be indicated by the inability of the operator to find the correct lag angle by pure static correction, as the points of tangency 12 and 34 of the first and second groups of circles will move around in a circle.

In correcting the wheel for a dynamic out of balance condition, the first group of circles 1 and 2 are first inscribed on a fresh recording disk in the manner hereinbefore described. As the lag angle for a dynamic reading is considerably less than the lag angle for a static reading, the test weights E2 need not be located as far from the points of tangency of the first and second group of circles as when testing for static out of balance. The second group of circles 3 and 4 then inscribed in the manner hereinbefore described and, if the line of tangency 34 of these circles coincides with the line of tangency 12 of the previously inscribed first group of circles 1 and 2, it indicates that the weights E2 are properly located to compensate for the lag angle. In correcting for dynamic out of balance, the weight may, as shown in Figs. 5 and 6, be divided on opposite sides of the wheel axis along a diameter thereof, and on opposite end faces of said wheel to counter the centrifugal force of the heavy spots which are located at opposite ends of the wheel and thus produce the dynamic torque unbalance when the wheel is rotated. The amount of final weight E3 necessary to dynamically balance the wheel is substituted for test weight E2; and when the third group of circles 5 and 6 is described on the recording disk at the hereinbefore mentioned predetermined relatively high and low speeds and are concentric, it indicates that the wheel is dynamically balanced.

The apparatus or machine used for carrying out the wheel balancing process hereinbefore described comprises a central longitudinal main body portion 7 having a seat 8 for the operator, compartments 9 just forward of said seat for the tools and weights used in balancing the wheel, wing portions 10 and 11 located on opposite sides of said body and projecting beyond the forward end thereof, a handle bar 9a at the rear end of said body, and a base frame 13 supporting said body and wings and provided at the front ends of its wing supporting portions with suitable supporting rollers or casters 14, whereby the apparatus may be tilted by said handle on said supporting rollers and readily pushed or pulled from place to place.

Located at the forward end of the main central body portion 7 of the apparatus between the forwardly extending portion of the wings 10 and 11 at the sides thereof is a vertically adjustable hollow post or upright 15 comprising a tubular lower section 16 and a tubular upper section 17 that is vertically slidable in said lower section and terminates at its upper end in a hollow head 18. The lower section 16 of the post 15 has a base flange 19 that seats on the central body portion 7 and is secured thereto by a vertical bolt 20 that extends upwardly through registering openings provided therefor in said body portion and base flange and has a nut 21 threaded on the upper end thereof that bears against the upper end of a sleeve 22 that is mounted on said bolt with its lower end in abutting relation to said base flange. The bolt receiving opening in the main body portion 7 is in the form of an elongated slot 23 that is disposed transverse to the longitudinal axis of said body, thereby permitting horizontal adjustment of the post 15 crosswise of the apparatus. The adjustable upper section 17 of the post 15 is clamped in the desired position of adjustment by means of a bolt 24 that extends through a vertically elongated slot 25 in said upper section and a horizontal hole in the lower section 16 and has a nut 26 threaded on the outer end thereof adapted to clamp the two post sections together between said nut and the head of the bolt. As shown in the drawings, the front wall of the upper section 17 of the hollow post has an opening 27 therein that extends from a point located near the bottom thereof to the top thereof; and an electric lamp 28 is mounted in said post opposite said opening.

The machine is provided on one side with a driving roller 29 that is adapted to be engaged with the tread of the tire of the wheel that is to be balanced to thereby rotate said wheel on its axis. The drive roller 29 is fixed to the armature shaft 30 of an electric motor 31 which is controlled by a suitable switch 32 mounted in the head 18 and has a cord 33 with a plug 33a for insertion in an electric socket (not shown). The motor 31 is mounted in a bail-shaped carrier or yoke 35 that is pivotally mounted, as at 36, in an upstanding bracket 37 at the forward end of the portion of the base frame 13 that supports the wing 10 that encloses said motor, whereby said motor is adapted to be swung in said bracket to move the driving roller 29 into and out of engagement with the tread of the wheel. The motor 31 is swung on its supporting pivots 36 into and out of driving engagement with the wheel by means of a pedal 38 in the wing 10 containing said motor. The pedal 38 is pivoted, as at 39, at one end on the base frame 13 and is supported at its free end on an outstanding lug 40 rigid with the pivotally supported motor supporting yoke 35. The pedal 38 is accessible through an opening 41 in the top of the wing 10, and downward pressure on said pedal forces the motor to swing on the pivots 36 and bring the drive roller 29 into engagement with the thread of the tire of the wheel A. When the pressure on the pedal 38 is released, the motor swings downwardly due to gravity to disengage the drive roller 29 from the tire.

Enclosed in the other or left wing 11 of the machine is a mechanism for applying a brake to the wheel to retard or stop the rotation thereof. This brake comprises a sleeve roller 42 rigidly supported on the crank end 43 of a horizontal shaft 44 that extends lengthwise of the machine and is rotatably supported in the notched upper ends of the upstanding arms of a channel-shaped bracket 45 fixed to the base frame 13 of said machine. Fixed to the crank shaft 44 is a radial arm 46 having a longitudinal slot 47 therein adapted to receive the free end of a bent arm 48 that is fixed to the free end of a pedal 49 that is supported on horizontal pivots 50 provided therefor on the base frame 13. This pedal is accessible through an opening 51 provided therefor in the wing 11, whereby downward pressure on said pedal causes said crank shaft to rotate in its supporting bracket 45 and swing the brake element 42 carried by the crank 43 of said shaft into engagement wtih the tread of the wheel.

As shown in the drawings, the crank arm is held down in the notches of the supporting bracket 45 by means of a coil spring 52 whose lower end is anchored to the base frame 13 and whose upper end is anchored to said shaft. This spring also tends to rotate the crank shaft 44 in a direction that will hold the brake element 42 clear of the tread of the tire and the operating pedal 49 in raised position, such movement of said brake element and pedal being limited by a stop lug 53 formed on the bracket 45 in the path of the slotted pedal actuated arm 46 of said crank shaft.

The hollow head 18 at the upper end of the post 15 of the machine has a speedometer 54 mounted therein in position to be observed by the operator when seated on the seat 8. This speedometer is driven by a flexible shaft 55 that extends through the opening 27 in the wheel opposing or front wall of the post 15 and terminates outside said post in a square or flat-sided plug or pin 56.

The marker or stylus D hereinbefore referred to is also supported in the hollow head 18 of the post 15. As shown in the drawings, this marker or stylus is rigid with the outer or wheel opposing end of a horizontally disposed rod 57 that is mounted for axial sliding movement towards and away from the wheel in a fixed supporting sleeve 58. The marker rod is normally retracted, that is, pulled inwardly or rearwardly in the head 18 by means of a heavy coil tension spring 59 having one end anchored in the rear portion of the head 18 of the post or uprgiht 15 and the other end anchored to a lever 60 pivotally supported, as at 61, in the upper section 17 of said post 15 for vertical swinging movement longitudinaly of the marker rod axis. The lever 60 terminates at its free upper end in a laterally offset upstanding fork portion 62 that straddles the marker rod 57 and is held by the spring 59 against a cross-bar 63 fixed to the rear end of said marker rod, whereby the pressure of said lever against said cross-bar serves to draw said marker rod rearwardly in the head 18 of the post 15.

The marker retracting lever 60 is swung forwardly against the tension of the coil spring 59 by means of a push rod 64 that is mounted for horizontal sliding movement in supporting brackets 65 provided therefor in the hollow head 18 rearwardly of said lever. The push rod 64 has its rear end located exteriorly and rearwardly of the rear end of the hollow head 18 and provided externally with a knob 66 in position to be grasped by the right hand of the operator when seated on the machine. The push rod 64 is disposed with its forward end in abutting relation to the rear face of the marker retracting lever 60, whereby said push rod, when pushed forwardly by the operator, bears against said lever and swings the same forwardly clear of the cross-bar 63 on the rear end of the marker rod 57. Rearward movement of said lever and the push rod 64 under the pull of said spring is limited by a washer 68 that is held on said rod by a cotter pin 69 and abuts against the forward support 65 for said rod.

Mounted one on each side of the marker rod 57 is a pair of coil tension springs 70 that extend longitudinally of said rod with their rear ends anchored to the cross-bar 63 at the rear end thereof and with their forward ends anchored to a cross-bar or head 71 fixed to the fixed marker rod supporting sleeve 58. The combined strength of the pair of coil springs 70 is less than the strength of the single, heavy lever retracting coil spring 59, whereby said pair of springs serve to project the marker rod 57 forwardly only when the push rod 64 is pushed forwardly against the pull action of said single, heavy spring.

The marker rod supporting sleeve 58 is rigidly supported in a plate 72 mounted for vertical sliding movement opposite the upper portion of the opening 27 in the front wall of the upper section 17 of the hollow post 15. As shown in the drawings, the marker rod supporting sleeve 58 extends horizontally through the vertically slidable plate 72 and is rigidly secured thereto by means of a nut 73 that is threaded on said sleeve and serves to rigidly clamp said plate between said nut and an annular shoulder on said sleeve. The sleeve supporting plate has a relatively large opening 74 therethrough, through which light from the electric lamp 28 may pass; and vertically disposed strips are secured by bolts 75 to the vertical side margins of said plate and form vertical grooves 76 in the side edges of said plate. The vertical grooves 76 are adapted to receive vertical guide plates or rails 77 that are secured by bolts 78 to the inner face of the front wall of the upper section 17 of the post 15, one on each side of the opening 27 therein.

The slide plate 72 is raised and lowered by means of a pinion 79 that cooperates with a vertical rack 80 provided therefor in a flange portion of one of the plates that define the groove 76 in one side of said slide plate. The pinion 79 is fixed to the inner end of a horizontally disposed shaft 81 that is preferably located in the horizontal plane of the push rod 64 and extends through an opening provided therefor in the rear end of the hollow head 18 and is rotatably supported in one of the push rod supporting brackets 65. The rear end of the shaft 81 is located outside of the head 18 where it is provided with a knob 82 adapted to be manipulated by the left hand of the operator while seated on the machine.

The squared plug 56 at the free end of the flexible speedometer shaft 55 is adapted to be inserted in a correspondingly shaped central hole or socket provided therefor in the central boss 83 of a circular adapter plate 84 which has a hub portion 85 adapted to fit over the hub 86 of the wheel that is to be balanced. The hub 85 of the adapter plate 84 is provided with a series of circumferentially spaced spring clips 87 that extend into the interior of said hub and are adapted to resiliently engage the hub 86 of the wheel. These clips serve to center the hub of the adapter plate 84 on the wheel hub 86 and force the said adapter plate to rotate with said wheel hub. By this arrangement, the adapter plate 84 is rotated by the wheel hub 86 when the wheel is driven by the motor driven drive roller 29 of the machine and the square pin and socket connection between the said adapter plate and the flexible drive shaft 55 of the speedometer 54 serves to rotate said shaft and thus operate said speedometer. The adapter plate 84 is adapted to support a number of the recording disks C hereinbefore referred to. These disks are provided with registering central circular openings through which the socket forming boss 83 of the adapter plate 84 extends and are clamped to said adapter plate around their peripheral margins by means of an annular clamping plate 88 that has a series of circumferentially spaced studs 89 thereon that extend through registering openings in said disks and said adapter plate and are threaded to receive wing nuts 90 which, when tightened, serve to clamp the recording disks between said annular clamping plate and said adapter plate.

When it is desired to balance the wheels of an automobile in the manner hereinbefore described, the wheel A is jacked up so as to freely rotate on its supporting axle or spindle B. The operator then grasps the handle bar 9a at the rear end of the machine and rolls the machine on its rollers 14 toward the wheel until the post 15 is opposite the center of the wheel and the forward ends of the wings 10 and 11 are located one on each side of the wheel with the drive roller 29 and brake 42 in position to be engaged with the tread of the wheel. The post 15 may then be adjusted vertically or horizontally to bring the stylus into the approximate position required for the diameter of wheel that is being tested and then locked in these adjusted positions by tightening the nuts 21 and 26. The seat 8 is then occupied by the operator and control switch 32 is then operated to start the motor 31 and the pedal 38 is then depressed to swing said motor and engage the driving roller 29 thereof with the tread of the wheel. The wheel is then rotated by the motor until the speedometer indicates a speed in excess of 1200 revolutions per minute after which the pedal 38 is released to disengage the driving roller from the tire. When the speed of the wheel reaches a speed of 1200 revolutions per minute, the push rod 64 is pushed forwardly by the operator to cause the marker or stylus D to engage the recording disk C rotating with the wheel, thereby describing first the circle 1. The brake pedal 49 is then depressed to reduce the speed of the wheel and released just before the speed reaches 300 revolutions per minute. When this speed of 300 revolutions per minute is reached, the marker D is again engaged by means of the push rod 64 with the recording disk C, thereby describing the second circle 2 which, as hereinbefore stated, is disposed eccentric to the first circle 1. The point of tangency of the two circles 1 and 2 is then marked on the disk by the radial line 12 and the circles 3 and 4, described at the speeds of 1200 and 300 revolutions per minute, respectively, the weight E positioned on the wheel in the manner hereinbefore described and the two circles 5 and 6 described at speeds of 1200 and 300 revolutions, respectively, to determine the correct amount of weight.

When it is desired to test and correct the rear wheels of an automobile, the wheel to be tested is jacked up so as to rotate freely while the other wheel is blocked and the wheel that is being tested is driven by the motor of the vehicle instead of the electric motor.

Obviously, the hereinbefore described apparatus admits of considerable modification without diverting from the invention. Therefore, I do not wish to be limited to the precise construction and arrangement shown and described.

What I claim is:

1. An apparatus for determining the static or dynamic unbalance of a wheel while on its normal axis of rotation comprising a record receiving member adapted to rotate with said wheel, and a portable unitary structure including a marker, means for moving said marker in a plane parallel with the wheel axis into and out of engagement with said record receiving member, manually operable gearing for moving said marker transversely of said wheel axis, a speedometer adapted to be operatively connected to said wheel to register the speed of rotation thereof, and a seat from which said record receiving member and said speedometer may be observed and access may be had to said marker moving means.

2. An apparatus for determining the static or dynamic unbalance of a wheel while on its normal axis of rotation comprising a record receiving member adapted to rotate with said wheel, a marker, means for moving said marker longitudinally of the wheel axis into and out of engagement with said record receiving member, means for moving said marker transversely of said wheel axis, a speedometer adapted to be operatively connected to said wheel to register the speed of rotation thereof, normally disengaged means for driving said wheel, and a brake for said wheel, said marker, marker moving means, speedometer, wheel driving means and wheel brake being all mounted in readily accessible positions in a single unitary structure.

3. An apparatus for determining the static or dynamic unbalance of a wheel while on its normal axis of rotation comprising a record receiving member adapted to rotate with said wheel, a marker, means for moving said marker longitudinally of the wheel axis into and out of engagement with said record receiving member, means for moving said marker transversely of said wheel axis, a speedometer adapted to be operatively connected to said wheel to register the speed of rotation thereof, normally disengaged means for driving said wheel, a brake for said wheel, pedal operated means for engaging said wheel driving means with said wheel, and pedal operated means for engaging said brake with said wheel, said marker, marker moving means, speedometer, wheel driving means, wheel brake and pedal operated means being all included in a single portable structure in such positions as to afford ready access thereto.

4. An apparatus for determining the static or dynamic unbalance of a wheel while on its normal axis of rotation comprising a record receiving member adapted to rotate with said wheel, and a single portable unit including a marker, means for moving said marker longitudinally of the wheel axis into engagement with said record receiving member, means for moving said marker transversely of said wheel axis, a speedometer adapted to be operatively connected to said wheel to register the speed of rotation thereof, means for driving said wheel, a brake for said wheel, separate means for engaging said wheel driving means and brake with said wheel, and a seat from which said speedometer may be observed and access may be had to the means for moving said marker longitudinally of said wheel axis, the means for moving said marker transversely of said axis and the means for engaging the wheel driving and brake means.

5. An apparatus for determining the static or dynamic unbalance of a wheel while on its normal axis of rotation comprising a record receiving member adapted to rotate with said wheel, and a single portable unitary structure including a marker, manually operable means for moving said marker longitudinally of the wheel axis into and out of engagement with said record receiving member, manually operable means for moving said marker transversely of said wheel axis, a speedometer adapted to be operatively connected to said wheel to register the speed of rotation thereof, pedal controlled means for driving said wheel, a pedal controlled brake for said wheel, a compartment for tools, counterweights and other accessories and a seat from which said record receiving member and said speedometer may be observed and access may be had to the means for moving said marker, to the pedals of said wheel driving means and brake and to said compartment.

6. A portable apparatus for determining the static or dynamic unbalance of a wheel while on its normal substantially horizontal axis of rotation comprising a record receiving member adapted to rotate with said wheel, and a single unitary portable structure consisting of a marker, manually operable means for moving said marker longitudinally of the wheel axis into and out of engagement with said record receiving member, manually operable means for moving said marker vertically of said wheel axis, a speedometer adapted to be operatively connected to said wheel to register the speed of rotation thereof, normally disengaged electrically driven means for driving said wheel, a brake for said wheel, a pedal for engaging said wheel driving means with said wheel, a pedal for engaging said brake with said wheel and means for illuminating said record receiving member, all mounted on said single unitary structure in such positions as to be readily accessible to the operator.

7. A portable apparatus for determining the static or dynamic unbalance of an automobile wheel while on its normal axis of rotation comprising a body adapted to be positioned opposite the outer face of said wheel, said body having a vertically extensible post terminating in a hollow head, a marker mounted in said hollow head, means including a horizontally slidable push rod for moving said marker towards and away from said face of said wheel, means including a rotary shaft located adjacent to said push rod for raising and lowering said marker, and a seat on said body from which access may be had to said push rod and said rotary shaft.

8. A portable apparatus for determining the static or dynamic unbalance of an automobile while on its normal axis of rotation comprising a body adapted to be positioned opposite the outer face of said wheel, said body having a vertically extensible post terminating in a hollow head, a marker mounted in said hollow head, means including a horizontally slidable push rod for moving said marker towards and away from said face of said wheel, means including a rotary shaft located adjacent to said push rod for raising and lowering said marker, a speedometer mounted in said head and adapted to be operatively connected to said wheel to be driven thereby, an electric motor movably supported on said body, a drive roller for said wheel mounted on and driven by said motor, pedal operated means mounted in said body for moving said motor to engage said drive roller with said wheel, a brake for said wheel mounted on said body, pedal operated means mounted on said body for engaging said brake with said wheel, and a seat on said body from which said speedometer may be observed and access may be had to said push rod, said rotary shaft and said pedals.

9. An apparatus for determining the static or dynamic unbalance of an automobile wheel while on its normal axis of rotation comprising a record receiving disk adapted to rotate with said wheel, a body adapted to be positioned with one end opposite said disk, supporting rollers for said end of said body, a handle on the opposite end of said body, a vertically extensible and horizontally adjustable post on said first mentioned end of said body terminating in a hollow head, a marker in said hollow head, a support for said marker vertically movable on said post, means including a horizontally slidable push rod for moving said marker into engagement with said disk, a spring for retracting said marker and a spring for assisting the movement of said marker into engagement with said disk, means for raising and lowering said marker support including a rotary shaft and a rack-and-pinion connection between said shaft and said marker support, a speedometer mounted in said head and adapted to be operatively connected to said disk to be driven thereby, an electric motor movably supported in said body, a drive roller for said wheel mounted on and driven by said motor, pedal operated means mounted in said body for moving said motor to engage said drive roller with said wheel, a brake for said wheel, pedal operated means mounted in said body for engaging said brake with said wheel, a light in said post for illuminating the portion of said disk opposite said marker, and a seat on said body from which said speedometer and said illuminated portion of said disk may be observed and access may be had to said push rod, said rotary shaft and said pedals.

10. An apparatus for determining the static or dynamic unbalance of a wheel while on its normal axis of rotation comprising a record receiving member adapted to rotate with said wheel, and a portable unitary structure movable into and out of operative relation to said record receiving member, said structure including a marker, means for moving said marker in a plane substantially parallel with the wheel axis into and out of engagement with said record receiving member, manual operable means for moving said marker transversely of said wheel axis, and a seat from which said record receiving member may be observed and access may be had to said marker moving means.

LEE HUNTER, Jr.